Aug. 10, 1954        J. C. SOUTER        2,686,246
APPARATUS FOR MAKING ELECTROSTATIC SHIELDS
Filed May 13, 1952        2 Sheets-Sheet 1
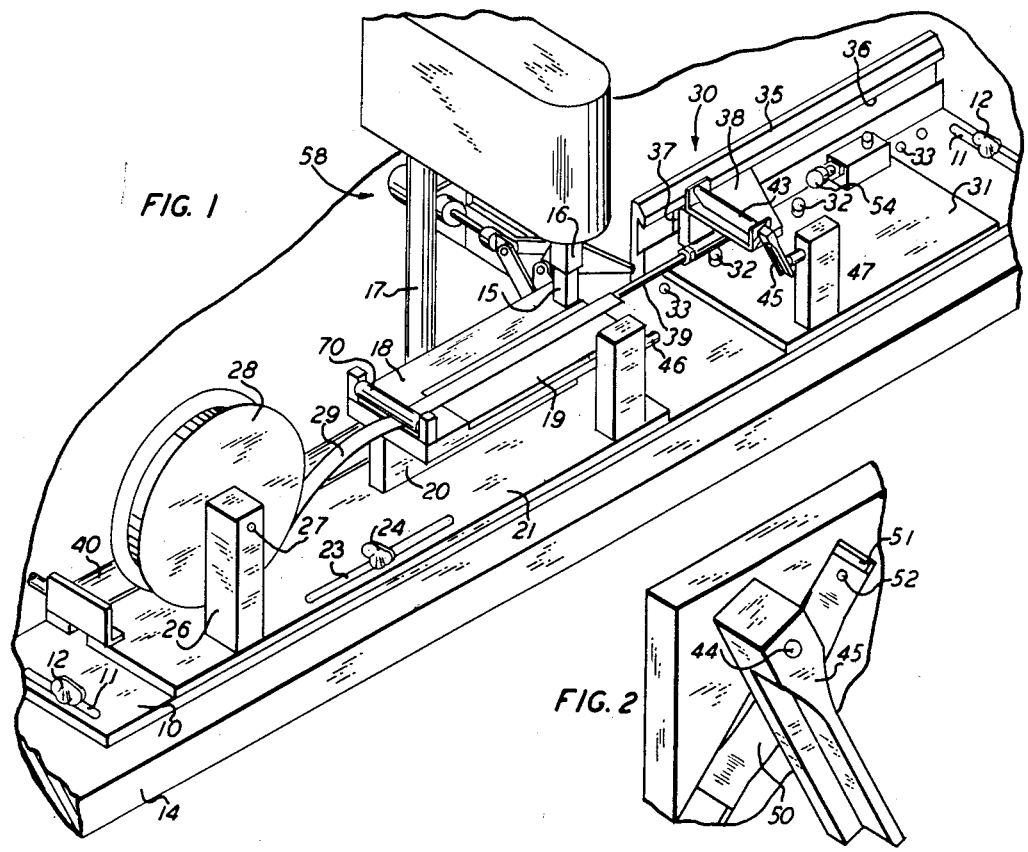
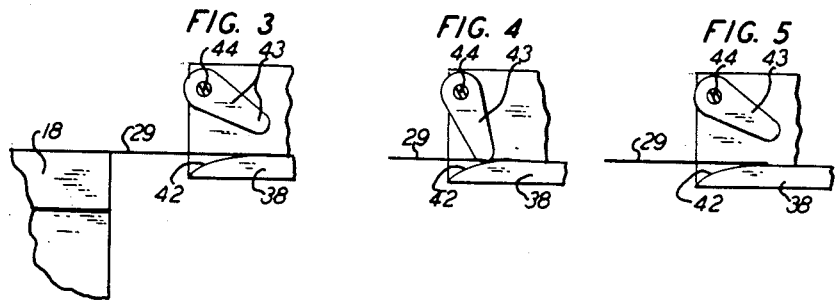
INVENTOR
J. C. SOUTER
BY *W. C. Parnell*
ATTORNEY

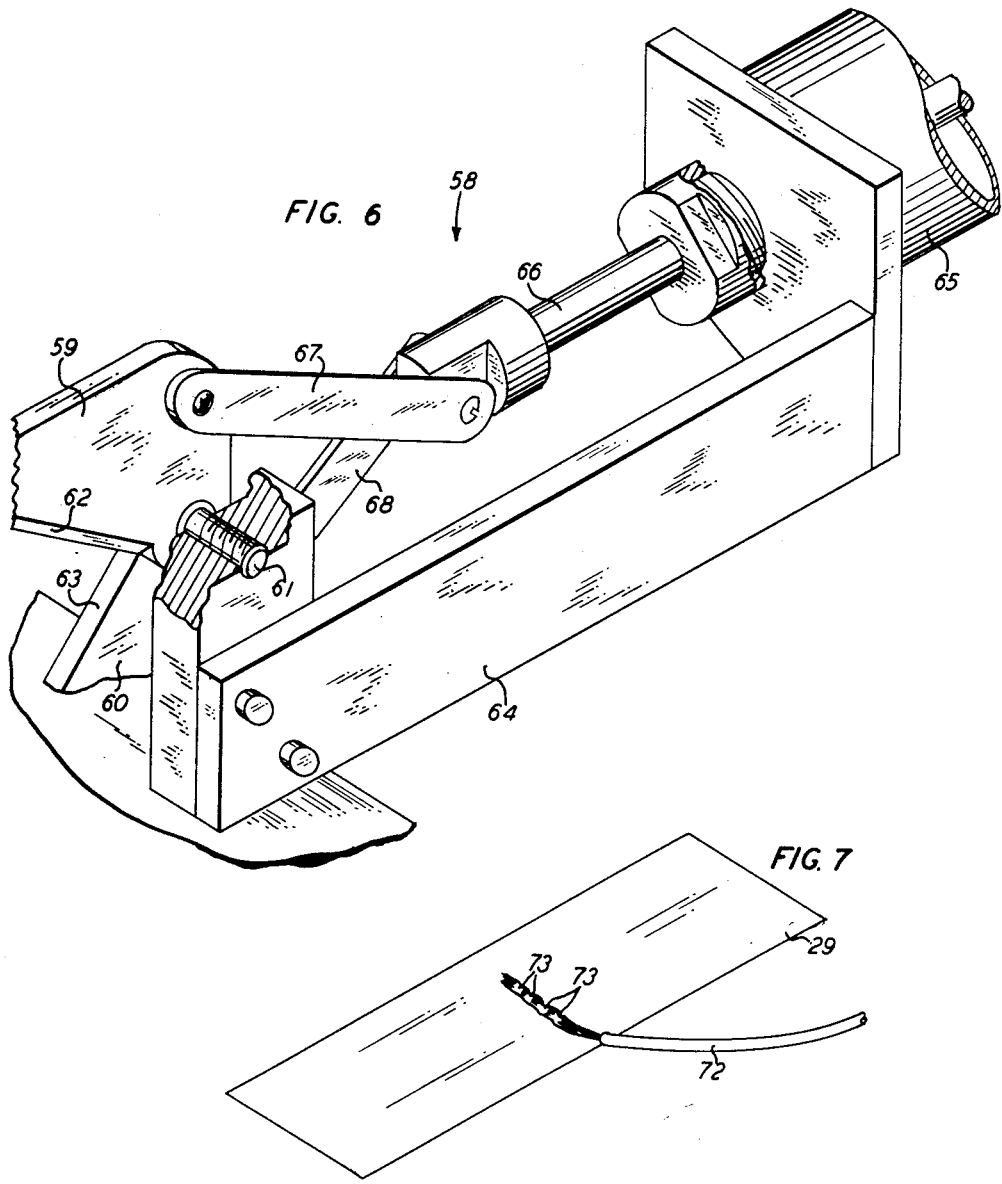

Patented Aug. 10, 1954

2,686,246

UNITED STATES PATENT OFFICE 2,686,246

APPARATUS FOR MAKING ELECTROSTATIC SHIELDS

John C. Souter, West Newbury, Mass., assignor to Western Electric Company, Incorporated, New York, N. Y., a corporation of New York Application May 13, 1952, Serial No. 287,521

2 Claims. (Cl. 219—4)

This invention relates to material working apparatus and more particularly to apparatus for welding terminals to successive lengths of metal foil.

Many types of coils and transformers used in communication equipment must be electrostatically shielded and this is ordinarily effected by means of sheets of metal foil wrapped around the windings and connected to ground. The connection to ground is made through a flexible stranded wire soldered to the foil. In practice it is difficult to confine the solder to the area between the wire strands and the foil with the result that the foil is materially thickened and stiffened for a considerable distance on each side of the wire. Since such shields do not conform well to the windings around which they are wrapped, some leakage occurs and the shields are not fully effective. When used between windings these stiffened portions also impair the coils by distorting the shape of the outer windings. Attempts to correct this condition by eliminating the solder and welding the strands of the wire to the foil at spaced points by means of conventional welding apparatus have not proved practicable. In a co-pending application Serial No. 285,425 filed May 1, 1952, now U. S. Patent 2,655,583 granted October 13, 1953, applicant has disclosed an electrode which is capable of making satisfactory welds of this type. The efficient use of this new welding apparatus however, requires that the successive portions of the foil be quickly and accurately positioned with respect to the electrode.

The object of the present invention is to provide a material working apparatus which is simple in structure and highly efficient for advancing material varied distances relative to a material working unit, such as a welding electrode.

With this and other objects in view, the invention comprises an apparatus having a table to support a material adjacent a working area and a feeding unit reciprocable between varied limits to advance the material pre-determined variable distances.

In the present embodiment of the invention, the apparatus is for use in welding terminal leads to lengths of metal foil advanced from a supply over the table where a portion of the table functions as a fixed electrode cooperating with a movable electrode to bring about welding of the successive terminals to the material or metal foil. The feeding unit includes a carriage pivotally supporting a gripping element connected to a metallic member attracted by permanent magnets disposed adjacent the limits of movement of the carriage to cause actuation of the gripping element. Furthermore, a shearing unit is operated in timed relation with the movable electrode and carriage for shearing the material into predetermined lengths.

Other objects and advantages will be apparent from the following detailed description when considered in conjunction with the accompanying drawings wherein:

Fig. 1 is an isometric view of the apparatus;

Fig. 2 is an enlarged fragmentary isometric view of the actuator for the clamping element;

Fig. 3 is a fragmentary detailed view of a portion of the table and carriage showing the carriage approaching the table to receive the material;

Fig. 4 is a fragmentary detailed view of the carriage and clamping element shown in clamping position;

Fig. 5 is a fragmentary detailed view showing the clamping element releasing the material at the end of the carriage structure away from the table;

Fig. 6 is an enlarged fragmentary isometric view of the shearing unit; and,

Fig. 7 is an isometric view of the completed article.

In the present embodiment of the invention, a base plate 10, having parallel elongate apertures 11 in the ends thereof, receives wing bolts 12 which extend through apertures in the bench 14 upon which the base plate is supported. A movable electrode 15 supported by an arm 16 carried by a vertically movable rod 17 is normally positioned above a table 18, but is movable between its normal position and its welding position by suitable means not shown, such as an air cylinder under the control of a foot valve.

The table 18 in the present embodiment of the invention is formed of suitable dielectric material having a metallic plate 19 serving as a lower electrode set in a recess in the table 18 and included in a welding circuit with the movable electrode 15. A vertical member 20 interposed between the table 18 and a support 21 holds the table at a given position on the support. The support 21 has parallel elongate apertures 23, only one of which is shown in the drawing. These apertures receive wing-bolts 24 carried by the base plate 10, whereby the support 21 may be adjusted longitudinally of the base plate to move the table 18 and the electrode 19 into any desired position relative to the electrode 15. An upright 26, assisted by another upright if so desired, supports a spindle 27 for a supply reel 28 of material 29 which in the present embodiment of the invention is metal foil.

A feeding unit indicated generally at 30 includes a horizontal member 31 adjustably mounted on the base plate 10 through the aid of suitable screws 32 receivable in certain of a series of threaded apertures 33 in the base plate. A vertical portion 35 has a longitudinally extending dove-tailed groove 36 therein to receive a dovetailed member 37 of a carriage 38. The carriage 38 is connected to the outer end of a piston rod 39 of an air cylinder 40 carried by the support 21. The carriage 38 is substantially equal in width to the width of the table 18 with one edge rounded as at 42 to cause the leading end of the material 29 to ride thereon and rest on the top of the carriage. The carriage 38 has uprights at the ends thereof to pivotally support a clamping element 43 shown more in detail in Figs. 3, 4 and 5. The pivot or shaft 44 for the clamping element 43 extends through one of the vertical supports of the carriage and has an actuating member 45 mounted thereon. This member is of the contour shown particularly in Fig. 2, and is attracted by permanent magnets 46 and 47 mounted on their respective supports 21 and 31, adjacent the ends of the strokes of the feeding unit 30. A resilient element or flat spring 50, supported in a groove 51 of the adjacent vertical portion of the carriage with one end secured at 52, is adapted to engage the inner surface of the actuating member 45 and hold it in either position into which it is moved by the magnets 46 and 47. In the present instance, the carriage 38 is limited in its forward movement by the table 18 or any other suitable means not shown and in its reverse movement by an adjustable stop 54 mounted on the support 31.

A shearing unit 58 shown in Figs. 1 and 6, includes shearing blades 59 and 60 pivotally supported at 61 and having shearing edges 62 and 63 normally open and positioned above and below the path of the material 39. A bracket 64 supporting the pivot 61 supports also an air cylinder 65, a piston rod 66 of which is connected through links 67 and 68 to the blades 59 and 60.

Considering now the operation of the apparatus, let it be assumed that the material 29 has been fed beneath a roller 70 and onto the table 18 where its leading portion will rest on the electrode 19 and extend for a given distance beyond the electrode. With the apparatus in the position shown in Fig. 1, the permanent magnet 47 has attracted the member 45 to move the clamp into the position shown in Fig. 5 where it will be held by the spring 50 during forward movement of the carriage, through operation of the air cylinder 40 to the table 18. As the carriage 30 reaches the table, the member 45 is actuated by the magnet 46 causing the element to clamp the material 29 against movement while the bared ends of the strands of a terminal 72 are spot welded at 73 to the material. Movement of the carriage 30 and operation of the shearing unit 58 are controlled in timed relation with the operation of the electrode 15, so that between welding operations the material 29 may be advanced a pre-determined distance, after which the shearing unit 58 will be operated to shear the completed article including the length of metal foil having the terminal welded thereon.

After the completed article is released through the actuation of the member 45 and clamping element 43 by the permanent magnet 47, the member and element are held in this position as shown in Fig. 3 by the spring 50, until the carriage reaches its position adjacent the table 18. During this movement of the carriage, the leading end of the material will be positioned on the carriage so that when the member 45 is attracted by the permanent magnet 46 into the closed position shown in Fig. 4, the leading end of the material will be gripped firmly and, after the welding operation, be moved with the carriage until the carriage engages the stop 54. During the forward rest interval of the feeding unit, the operator places the terminal 72 with its bare strands on the material 29 beneath the electrode 15 so that the terminal may be welded to the material producing the article shown in Fig. 7. After the completion of the advancing movement of the feeding unit the shearing unit 58 is operated, shearing the given variable length of material from the supply allowing it to drop into a receptacle (not shown) as it was released by the element 43 through the attraction of the member 45 by the magnet 47. The shearing unit 58 is positioned relative to the table to leave a leading end of the material 29 overhanging the end of the table ready to be received by the unit 30.

It is to be understood that the above described arrangements are simply illustrative of the application of the principles of the invention. Numerous other arrangements may be readily devised by those skilled in the art and will embody the principles of the invention and fall within the spirit and scope thereof.

What is claimed is:

1. The combination with an apparatus having a material working member operable through repeated cycles in a working area and a unit operable at predetermined intervals during each operating cycle of the material working member to cut lengths from the material leaving successive leading ends of the material, of a support for the material in the working area having one end terminating short of the successive leading ends of the material, a carriage supported for reciprocable movement relative to the support between a first limit adjacent said end of the support and a second limit spaced therefrom, means to reciprocate the carriage between said limits, a shelf on the carriage movable beneath the successive leading ends of the material, an element supported for rocking movement by the carriage and movable between an open position away from the shelf and a gripping position adjacent the shelf to cooperate therewith in gripping the material to advance it longitudinally during movement of the carriage to its second limit, a magnetically attractable arm fixed to the element, and magnetic units disposed adjacent the said limits to attract the arm to move the element into gripping position adjacent the first limit and to attract the arm to move the element into open position at the second limit.

2. The combination with an apparatus having a material working member operable through repeated cycles in a working area and a unit operable at predetermined intervals during each operating cycle of the material working member to cut lengths from the material leaving successive leading ends of the material, of a support for the material in the working area having one end terminating short of the successive leading ends of the material, a carriage supported for reciprocable movement relative to the support between a first limit adjacent said end of the support and a second limit spaced therefrom, means to reciprocate the carriage between said limits, a shelf on the carriage movable beneath the successive leading ends of the material, an element supported for rocking movement by the carriage and movable between an open position away from the shelf and a gripping position adjacent the shelf to cooperate therewith in gripping the material to advance it longitudinally during movement of the carriage to its second limit, a magnetically attractable arm fixed to the element, magnetic units disposed adjacent the said limits to attract the arm to move the element into gripping position adjacent the first limit and to attract the arm to move the element into open position at the second limit and means supported by the carriage to hold the arm and element in either position.

References Cited in the file of this patent

UNITED STATES PATENTS

| Number | Name | Date |
|---|---|---|
| 1,032,629 | Sielaff | July 16, 1912 |
| 1,066,577 | Bertsch | July 18, 1913 |
| 1,091,855 | Lynah | Mar. 31, 1914 |
| 1,305,343 | De Smith | June 3, 1919 |
| 1,685,344 | Stuart | Sept. 25, 1928 |
| 2,024,597 | Pfeiffer | Dec. 17, 1935 |
| 2,129,845 | King | Sept. 13, 1938 |
| 2,263,721 | De Lorme | Nov. 25, 1941 |
| 2,322,290 | Gabel | June 22, 1943 |
| 2,428,493 | Haller | Oct. 7, 1947 |
| 2,477,859 | Burge | Aug. 2, 1949 |
| 2,578,960 | Alger | Dec. 18, 1951 |
| 2,597,675 | Sackett | May 20, 1952 |